United States Patent
Yamaguti

(10) Patent No.: US 9,663,407 B2
(45) Date of Patent: May 30, 2017

(54) SILICON NITRIDE WEAR RESISTANT MEMBER AND METHOD FOR PRODUCING SILICON NITRIDE SINTERED COMPACT

(71) Applicants: KABUSHIKI KAISHA TOSHIBA, Tokyo (JP); TOSHIBA MATERIALS CO., LTD., Yokohama-Shi (JP)

(72) Inventor: Haruhiko Yamaguti, Yokohama (JP)

(73) Assignees: Kabushiki Kaisha Toshiba, Tokyo (JP); Toshiba Materials Co., Ltd., Yokohama-Shi, Kanagawa-Ken (JP)

( * ) Notice: Subject to any disclaimer, the term of this patent is extended or adjusted under 35 U.S.C. 154(b) by 0 days.

(21) Appl. No.: 14/896,775

(22) PCT Filed: Jun. 11, 2014

(86) PCT No.: PCT/JP2014/065436
§ 371 (c)(1),
(2) Date: Dec. 8, 2015

(87) PCT Pub. No.: WO2014/200014
PCT Pub. Date: Dec. 18, 2014

(65) Prior Publication Data
US 2016/0137556 A1 May 19, 2016

(30) Foreign Application Priority Data
Jun. 13, 2013 (JP) ................. 2013-124875

(51) Int. Cl.
*C04B 35/587* (2006.01)
*C04B 35/593* (2006.01)
*F16C 33/32* (2006.01)

(52) U.S. Cl.
CPC ........ *C04B 35/593* (2013.01); *C04B 35/5935* (2013.01); *F16C 33/32* (2013.01);
(Continued)

(58) Field of Classification Search
CPC . C04B 35/587; C04B 35/593; C04B 35/5935; F16C 33/32; F16C 33/62
See application file for complete search history.

(56) References Cited

U.S. PATENT DOCUMENTS 5,556,815 A * 9/1996 Boberski ............. C04B 35/5935
501/97.2
7,192,899 B2 * 3/2007 Komatsu ............... C04B 35/593
501/97.2
(Continued)

FOREIGN PATENT DOCUMENTS

JP 05294732 * 11/1993
JP 06-279123 A1 10/1994
(Continued)

OTHER PUBLICATIONS

International Search Report (Application No. PCT/JP2014/065436) dated Aug. 26, 2014.
(Continued)

*Primary Examiner* — Karl Group
(74) *Attorney, Agent, or Firm* — Burr & Brown, PLLC

(57) ABSTRACT

The present invention provides a silicon nitride wear resistant member comprising a silicon nitride sintered compact containing $\beta$-$Si_3N_4$ crystal grains as a main component, 2 to 4% by mass of a rare earth element in terms of oxide, 2 to 6% by mass of Al in terms of oxide, and 0.1 to 5% by mass of Hf in terms of oxide, wherein the silicon nitride sintered compact has rare earth-Hf—O compound crystals; in an arbitrary section, an area ratio of the rare earth-Hf—O compound crystals in a grain boundary phase per unit area of 30 $\mu m \times 30$ $\mu m$ is 5 to 50%; and variation of the area ratios of the rare earth-Hf—O compound crystals between the unit areas is 10% or less. Due to above structure, there can be provided a wear resistant member comprising the silicon nitride sintered compact having an excellent wear resistance and processability.

11 Claims, 1 Drawing Sheet

(52) U.S. Cl.
CPC ............... *C04B 2235/3217* (2013.01); *C04B 2235/3224* (2013.01); *C04B 2235/3225* (2013.01); *C04B 2235/3232* (2013.01); *C04B 2235/3244* (2013.01); *C04B 2235/3826* (2013.01); *C04B 2235/3839* (2013.01); *C04B 2235/3865* (2013.01); *C04B 2235/3878* (2013.01); *C04B 2235/3882* (2013.01); *C04B 2235/3895* (2013.01); *C04B 2235/549* (2013.01); *C04B 2235/5445* (2013.01); *C04B 2235/608* (2013.01); *C04B 2235/767* (2013.01); *C04B 2235/77* (2013.01); *C04B 2235/85* (2013.01); *C04B 2235/96* (2013.01); *C04B 2235/963* (2013.01); *F16C 2206/60* (2013.01)

(56) References Cited

U.S. PATENT DOCUMENTS

| | | | | |
|---|---|---|---|---|
| 7,612,006 | B2* | 11/2009 | Komeya | B82Y 30/00 252/506 |
| 9,440,887 | B2* | 9/2016 | Funaki | F16C 33/32 |
| 2002/0010068 | A1 | 1/2002 | Komatsu | |
| 2004/0191535 | A1 | 9/2004 | Komatsu | |
| 2009/0238508 | A1 | 9/2009 | Takao | |
| 2012/0321851 | A1 | 12/2012 | Takao | |
| 2015/0251957 | A1* | 9/2015 | Funaki | F16C 33/32 501/89 |

FOREIGN PATENT DOCUMENTS

| | | |
|---|---|---|
| JP | 2001-328869 A1 | 11/2001 |
| JP | 2003-034581 A1 | 2/2003 |
| JP | 2004-256339 A1 | 9/2004 |
| WO | 2008/032427 A1 | 3/2008 |
| WO | 2011/102298 A1 | 8/2011 |
| WO | 2013/035302 A1 | 3/2013 |

OTHER PUBLICATIONS

English translation of International Preliminary Report on Patentability (Chapter I) (Application No. PCT/JP2014/065436) dated Dec. 23, 2015.

* cited by examiner

SILICON NITRIDE WEAR RESISTANT MEMBER AND METHOD FOR PRODUCING SILICON NITRIDE SINTERED COMPACT

BACKGROUND OF THE INVENTION

1. Field of the Invention

The embodiments to be described below generally relate to a silicon nitride wear resistant member and a method for producing the same.

2. Description of Related Art

Silicon nitride sintered compacts (sintered bodies) have been used as wear resistant members such as bearing balls and rollers utilizing the wear resistance thereof. Examples of known sintering composition of conventional silicon nitride sintered compacts include a silicon nitride/yttrium oxide/aluminum oxide/aluminum nitride/titanium oxide system (Patent Document 1: Japanese Patent Laid-Open No. 2001-328869). Sinterability is improved by using yttrium oxide, aluminum oxide, aluminum nitride, and titanium oxide as a sintering aid, thus obtaining a silicon nitride sintered compact having excellent wear resistance.

Further, Patent Document 2 (Japanese Patent Laid-Open No. 2003-34581) discloses a silicon nitride sintered compact using yttrium oxide/$MgAl_2O_4$ spinel/silicon carbide/titanium oxide as a sintering aid. In Patent Document 2, sintering temperature can be lowered to 1600° C. or less.

All the sintered compacts shown in the above Patent Document 1 and Patent Document 2 have satisfactory sinterability and excellent wear resistance. On the other hand, these conventional silicon nitride sintered compacts have high hardness and are hardly-processable materials. A wear resistant member such as a bearing ball is required to have a sliding surface which is a smooth surface having a surface roughness Ra of 0.1 μm or less. Diamond abrasive grains are generally used for processing the surface of the above silicon nitride sintered compact. However, since a conventional silicon nitride sintered compact is a hardly-processable material, there is a problem that the load of polishing is large, causing cost increase.

PRIOR ART DOCUMENTS

Patent Document

Patent Document 1: Japanese Patent Laid-Open No. 2001-328869
Patent Document 2: Japanese Patent Laid-Open No. 2003-34581

SUMMARY OF THE INVENTION

Problems to be Solved by the Invention

Conventional silicon nitride sintered compacts have been developed by focusing only on improving material properties such as fracture toughness in order to improve the wear resistance. Certainly, wear resistance is improved by improving material properties. Such a silicon nitride sintered compact is the best for a bearing ball in a high load environment such as a working machine.

On the other hand, a wear resistant member such as a bearing ball is not only used in a high load environment but also used for applications in a low load environment such as a bearing for fan motors in a personal computer (PC) or the like. Since silicon nitride sintered compacts described in Patent Document 1 and Patent Document 2 are excellent in properties, they can also be used for a bearing for fan motors. However, there is arisen a problem that the processability is poor, and the cost is high.

An object of the present invention is to cope with these problems and to provide a silicon nitride sintered compact having good processability.

Means for Solving the Problems

A silicon nitride wear resistant member according to the embodiment comprises a silicon nitride sintered compact containing β-$Si_3N_4$ crystal grains as a main component, 2 to 4% by mass of a rare earth element in terms of oxide, 2 to 6% by mass of Al in terms of oxide, and 0.1 to 5% by mass of Hf in terms of oxide, wherein the silicon nitride sintered compact has rare earth-Hf—O compound crystals; in an arbitrary section, an area ratio of the rare earth-Hf—O compound crystals in a grain boundary phase per unit area of 30 μm×30 μm is 5 to 50%; and variation of the area ratios of the rare earth-Hf—O compound crystals between the unit areas is 10% or less.

Further, a method for producing a silicon nitride sintered compact according to the embodiment comprises the steps of: preparing a raw material mixture in which 2 to 4% by mass of a rare earth element in terms of oxide, 2 to 6% by mass of Al in terms of oxide, and 0.1 to 5% by mass of Hf in terms of oxide are added to a silicon nitride powder which is synthesized by a metal nitriding method, has an oxygen content of 1.5% by mass or less, contains α-phase silicon nitride in an amount of 80% by mass or more, and has an average particle size of 1 μm or less; molding the resulting mixture powder to obtain a molded product having a relative density of 50 to 58%; and sintering the resulting molded product at a temperature of 1600 to 1950° C. in a non-oxidizing atmosphere, wherein the resulting silicon nitride sintered compact has rare earth-Hf—O compound crystals; in an arbitrary section, an area ratio of the rare earth-Hf—O compound crystals in a grain boundary phase per unit area of 30 μm×30 μm is 5 to 50%; and variation of the area ratios of the rare earth-Hf—O compound crystals between the unit areas is 10% or less.

Advantages of the Invention

In the silicon nitride wear resistant member of the present embodiment, the presence ratio of the rare earth-Hf—O compound crystals is controlled. Therefore, the silicon nitride wear resistant member has an excellent wear resistance. In addition, there is an advantage that surface finishing such as polishing can be easily performed. Further, according to the method for producing a silicon nitride wear resistant member of the present embodiment, a silicon nitride sintered compact in which the presence ratio of the rare earth-Hf—O compound crystals is controlled can be effectively obtained.

DETAILED DESCRIPTION OF THE INVENTION

Figure 1:
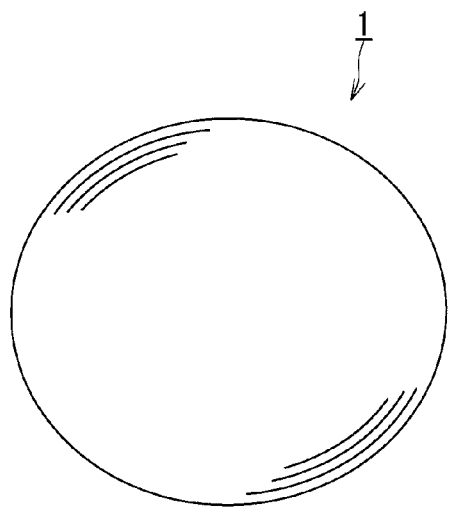
FIG. 1 is a perspective view showing an example of a bearing ball of the embodiment.

A silicon nitride wear resistant member according to the present embodiment comprises a silicon nitride sintered compact containing β-$Si_3N_4$ crystal grains as a main component, 2 to 4% by mass of a rare earth element in terms of oxide, 2 to 6% by mass of Al in terms of oxide, and 0.1 to 5% by mass of Hf in terms of oxide, wherein the silicon nitride sintered compact has rare earth-Hf—O compound crystals; in an arbitrary section, an area ratio of the rare earth-Hf—O compound crystals in a grain boundary phase per unit area of 30 μm×30 μm is 5 to 50%; and variation of the area ratios of the rare earth-Hf—O compound crystals between the unit areas is 10% or less.

First, additive components will be described. The silicon nitride sintered compact contains a rare earth element in an amount of 2 to 4% by mass in terms of oxide. The rare earth element is preferably at least one selected from Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), and Lu (lutetium).

When a rare earth element is represented by R, R in terms of oxide is represented by $R_2O_3$. When a rare earth element is added as a sintering aid, the rare earth element is preferably added as a rare earth oxide powder. If the amount of the rare earth element is less than 2% by mass in terms of oxide, the amount of the rare earth-Hf—O compound crystals formed will be reduced, causing a reduction in mechanical properties and processability of a wear resistant member. If the amount of the rare earth element is more than 4% by mass, the variation in the amount of the rare earth-Hf—O compound crystals formed will be large. Among the rare earth elements, yttrium is preferred. Yttrium is a component which easily forms Y—Hf—O compound crystals.

The silicon nitride sintered compact contains Al (aluminum) in an amount of 2 to 6% by mass in terms of oxide. Al is expressed in terms of oxide as $Al_2O_3$. If the amount of Al is less than 2% by mass or more than 6% by mass in terms of oxide, a reduction in strength will be caused, reducing the durability as a wear resistant member. A component for adding Al is not particularly limited as long as the component contains Al, but the component is preferably any one or more of AlN, $Al_2O_3$, and $MgAl_2O_4$ spinel. Particularly, it is preferred to add AlN in combination with $Al_2O_3$ or $MgAl_2O_4$. When AlN is used in combination with $Al_2O_3$ or $MgAl_2O_4$, AlN tends to suppress the decomposition of silicon nitride and $SiO_2$ to SiO, thereby accelerating uniform grain growth and increasing the crystallinity of a grain boundary phase structure. In addition, a crystalline compound with Hf and a rare earth element is easily produced. As a result, the presence ratio of the rare earth-Hf—O compound crystals in a grain boundary phase can be controlled.

The silicon nitride sintered compact contains Hf (hafnium) in an amount of 0.1 to 5% by mass in terms of oxide. Hf is expressed in terms of oxide as $HfO_2$. Hf is a component which easily reacts with a rare earth element (or a rare earth element compound) and can form rare earth-Hf—O compound crystals. When a Hf component is added, it is preferably added as a $HfO_2$ powder. The presence ratio of the rare earth-Hf—O compound crystals can be easily controlled by adding Hf as a $HfO_2$ powder. If the content of the Hf component is less than 0.1% by mass in terms of oxide, the amount of the rare earth-Hf—O compound crystals formed will be reduced. On the other hand, if the content of the Hf component is more than 5% by mass, the variation in the presence ratios of the rare earth-Hf—O compound crystals will be large. The Hf content is preferably set to 0.5 to 3% by mass in terms of oxide.

The silicon nitride sintered compact containing such a sintering aid component has rare earth-Hf—O compound crystals. The composition of the rare earth-Hf—O compound is not particularly limited as long as the compound has a rare earth element, Hf, and oxygen as the components. Examples of the rare earth-Hf—O compound include rare earth-Hf—O and rare earth-Hf—O—N. A part or all of the rare earth-Hf—O compound needs to be in a crystalline form.

Further, with respect to the rare earth-Hf—O compound crystals, an area ratio of the rare earth-Hf—O compound crystals in a grain boundary phase per unit area of 30 μm×30 μm is 5 to 50% in an arbitrary section of the silicon nitride sintered compact, and variation of the area ratios of the rare earth-Hf—O compound crystals between the unit areas is 10% or less.

The presence or absence of the rare earth-Hf—O compound crystals can be identified by the presence or absence of a peak by XRD to be described below. The area ratio per unit area can be analyzed by SEM observation. When SEM observation is performed, the rare earth-Hf—O compound crystals look white. On the other hand, $Si_3N_4$ crystal grains and a grain boundary glass phase look deep gray.

Further, the $Si_3N_4$ crystal grains can also be distinguished from the grain boundary glass phase by using an enlarged SEM photograph taken at a magnification of 4000 times or more. The $Si_3N_4$ crystal grain has an elongated particle shape when the crystal grain is a β-type and a circular (round) particle shape when the crystal grain is an α-type. A grain boundary glass phase is present as an amorphous phase in the grain boundary between the $Si_3N_4$ crystal grains. Therefore, if a photograph (SEM photograph) taken and enlarged at a magnification of 4000 times or more is used, the $Si_3N_4$ crystal grains can be distinguished from the grain boundary glass phase.

Figure 2:
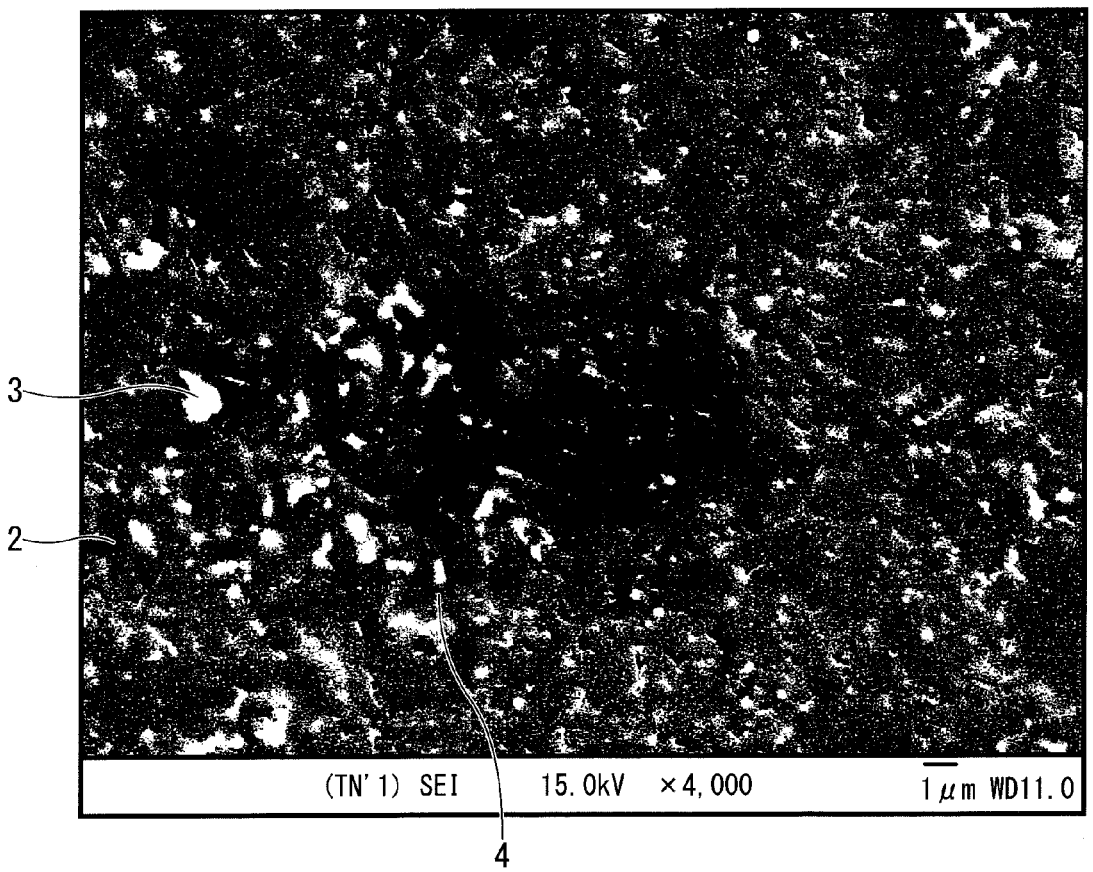
FIG. 2 is a SEM photograph showing an example of a structural photograph of a silicon nitride sintered compact of the embodiment.

Further, pores look black. Note that when an arbitrary section of the sintered compact is subjected to SEM observation, the section is polished until it has a surface roughness Ra of 0.05 μm or less. FIG. 2 shows a SEM photograph showing an example of a structural photograph of a silicon nitride sintered compact of the embodiment. In FIG. 2, reference numeral 2 denotes a $Si_3N_4$ crystal grain; reference numeral 3 denotes a rare earth-Hf—O compound crystal; and reference numeral 4 denotes a grain boundary glass phase. As is apparent from the structural form shown in FIG. 2, the rare earth-Hf—O compound crystal is observed to be white.

The area of the grain boundary phase (the sum of a grain boundary glass phase and rare earth-Hf—O compound crystals) per unit area of 30 μm×30 μm is determined. Next, the total area of the rare earth-Hf—O compound crystals per unit area of 30 μm×30 μm is determined. The area ratio (%) of the rare earth-Hf—O compound crystals in a grain boundary phase per unit area of 30 μm×30 μm is determined by a calculation formula:

[(total area of rare earth-Hf—O compound crystals)/
(area of grain boundary phase)]×100(%).

In an arbitrary section of the silicon nitride sintered compact of the embodiment, the area ratio of the rare earth-Hf—O compound crystals in a grain boundary phase per unit area of 30 μm×30 μm is within the range of 5 to 50%.

Moreover, the variation of the area ratio (%) per unit area is 10% or less. Five places each having a unit area of 30 μm×30 μm which do not overlap each other are measured for the area ratios, and an average value of the area ratios in the five places are determined. The variation of the area ratios represents the deviation of each area ratio from the average value. For example, when five area ratios (%) which do not overlap each other are represented by M1, M2, M3, M4, and M5, each of M1 to M5 is within the range of 5 to 50%. When the average value of the area ratios is represented by M6, M6=(M1+M2+M3+M4+M5)/5. The variation of the area ratios (%) can be determined by |[(M6−Mn)/M6|×100(%), where n is an integer of 1 to 5. With respect to the silicon nitride sintered compact of the embodiment, each of M1 to M5 has a variation of 10% or less from the average value M6.

That is, in a fine area of a unit area of 30 μm×30 μm, a predetermined amount of the rare earth-Hf—O compound crystals are allowed to be present, and the variation in the amount (area ratio) of the crystals is reduced. The silicon nitride sintered compact contains $\beta$-$Si_3N_4$ crystal grains as a main component and has a grain boundary phase comprising sintering aid components such as a rare earth element, Al, and Hf. The $\beta$-$Si_3N_4$ crystal grains have a hardness different from that of the grain boundary phase, and the $\beta$-$Si_3N_4$ crystal grains are harder than the grain boundary phase. The grain boundary phase comprises rare earth-Hf—O compound crystals and a grain boundary glass phase.

When the silicon nitride sintered compact is used for a silicon nitride wear resistant member, it is effective to subject the sintered compact to surface polishing to obtain a flat and smooth surface having a surface roughness Ra of 0.05 μm or less. Examples of the surface polishing of the silicon nitride sintered compact include lapping with a diamond wheel. Particularly, the lapping with a diamond wheel is effective for obtaining a spherical wear resistant member in which the whole surface serves as a sliding surface like a bearing ball.

When the silicon nitride sintered compact has been subjected to lapping, the $Si_3N_4$ crystal grains have been shaved off to a different level from that of the grain boundary glass phase due to the difference in the hardness between the $Si_3N_4$ crystal grains and the glass phase. When a hard grindstone such as a diamond wheel is used, the hard $Si_3N_4$ crystal grains are removed earlier, and the soft grain boundary glass phase is removed later. This is because the diamond wheel strongly hits the hard $Si_3N_4$ crystal grains. The silicon nitride sintered compact of the embodiment can increase the hardness of the grain boundary phase by allowing a predetermined amount of rare earth-Hf—O compound crystals to be present in the grain boundary phase.

The $Si_3N_4$ crystal grains can be shaved off to the same level as that of the grain boundary glass phase by bringing the hardness of the grain boundary phase close to that of the $Si_3N_4$ crystal grains. Therefore, this can shorten polishing time. In order to equalize the hardness of the grain boundary phase with that of the $Si_3N_4$ crystal grains, it is effective to allow a predetermined amount of rare earth-Hf—O compound crystals to be present.

Further, the rare earth-Hf—O compound crystal is preferably a compound crystal represented by $R_2Hf_2O_7$, where R represents rare earth. Since the $R_2Hf_2O_7$ compound crystal has hardness close to that of the $Si_3N_4$ crystal grains, the effect in which the $Si_3N_4$ crystal grains are shaved off to the same level as that of the grain boundary glass phase can be easily obtained. Examples of $R_2Hf_2O_7$ may include $Y_2Hf_2O_7$ and $Er_2Hf_2O_7$. $Y_2O_3$ and $Er_2O_3$ are preferably used as a sintering aid.

The rare earth-Hf—O compound crystal may contain other components such as Ca.

When the silicon nitride sintered compact is subjected to XRD analysis, intensity I1 of a peak at 30.0±0.5° based on the rare earth-Hf—O compound crystal and intensity I2 of a peak at 27.1±0.5° and intensity I3 of a peak at 33.7±0.5° based on the $\beta$-$Si_3N_4$ crystal preferably satisfy the relational expression: I1/[(I2+I3)/2]=0.1 to 0.2.

Note that in the XRD analysis, an arbitrary section of the silicon nitride sintered compact is used as a measuring plane. The measuring plane is a polished surface which is polished to a surface roughness Ra of 0.05 μm or less. The XRD analysis is performed using a Cu target (Cu-Kα), at a tube voltage of 40 kV, at a tube current of 40 mA, at a scanning speed of 2.0°/min, using a slit (RS) of 0.15 mm, and in a scanning field (2θ) of 10° to 60°.

A position (2θ) for detecting a peak in the XRD analysis is determined by the composition of a crystalline compound. The height of the peak is determined depending on the amount of the crystalline compound. The fact that the intensity I1 of a peak at 30.0±0.5° is detected shows that a predetermined amount of a rare earth-Hf—O compound is formed. Examples of the rare earth-Hf—O compound crystal include $Y_2Hf_2O_7$ or the like.

The intensity I2 of a peak at 27.1±0.5° and the intensity I3 of a peak at 33.7±0.5° are from the peaks based on the $\beta$-$Si_3N_4$ crystals. The I2 and I3 are from two large representative peaks in the peaks based on the $\beta$-$Si_3N_4$ crystal grains. Further, the reason why (I2+I3)/2 (average value of I2 and I3) is used as the denominator is to suppress the influence in which the peak height of I2 and I3 changes with the orientation of the $\beta$-$Si_3N_4$ crystal grains.

Further, the fact that the relational expression: I1/[(I2+I3)/2]=0.1 to 0.2 is satisfied shows that rare earth-Hf—O compound crystals having good crystallinity are formed. Wear resistance in combination with processability can be achieved by allowing rare earth-Hf—O compound crystals having good crystallinity to be present as described above.

The fact that the relational expression: I1/[(I2+I3)/2]=0.1 to 0.2 is satisfied shows a state where 90% by mass or more of Hf contained (Hf in an amount of 0.1 to 5% by mass in terms of oxide) have formed rare earth-Hf—O compound crystals.

The rare earth-Hf—O compound crystals preferably have an average particle size of 1 μm or less. An aggregate of the rare earth-Hf—O compound crystals preferably has a maximum particle size of 5 μm or less. The effect is obtained by allowing a predetermined amount of the rare earth-Hf—O compound crystals to be present. On the other hand, if the size of the rare earth-Hf—O compound crystals is too large, the rare earth-Hf—O compound crystals and the aggregate thereof will serve as a starting point of destruction (breakage) and may reduce wear resistance.

The silicon nitride sintered compact according to the embodiment preferably contains at least one selected from among 4a group (family) elements (except Hf), 5a group elements, and 6a group elements in an amount of 0.1 to 5% by mass in terms of oxide. The 4a group elements (except Hf) are Ti (titanium) and Zr (zirconium). The 5a group elements are V (vanadium), Nb (niobium), and Ta (tantalum). The 6a group elements are Cr (chromium), Mo (molybdenum), and W (tungsten). The 4a group elements (except Hf) are expressed in terms of oxide as $TiO_2$ and $ZrO_2$. The 5a group elements are expressed in terms of oxide as $V_2O_5$, $Nb_2O_5$, and $Ta_2O_5$. The 6a group elements are expressed in terms of oxide as $Cr_2O_3$, $MoO_3$, and $WO_3$.

When a 4a group element (except Hf) component, a 5a group element component, and a 6a group element component are added as a sintering aid, it is preferred to add these components as any one of an oxide, a carbide, and a nitride. If the content is less than 0.1 wt %, the effect of addition will be insufficient, while if the content is more than 5 wt %, sinterability (sintering property) will get worse on the contrary.

The grain boundary phase can be strengthened by allowing the 4a group element (except Hf) component, the 5a group element component, and the 6a group element component to be present. Therefore, the 4a group element (except Hf) component, the 5a group element component, and the 6a group element component are preferably powders having an average particle size of 2 μm or less. When any one of the 4a group element (except Hf) component, the 5a group element component, and the 6a group element component is used as a carbide powder, the effect of strengthening the grain boundary phase and improving lubrication properties of sliding surfaces can be obtained.

The silicon nitride sintered compact of the embodiment preferably contains SiC in an amount of 2 to 7% by mass. SiC is preferably a powder having an average particle size of 2 μm or less. The SiC powder can improve the strengthening of the grain boundary phase and the lubrication properties of sliding surfaces. The content of SiC is calculated in terms of SiC.

The silicon nitride sintered compact of the embodiment preferably has a relative density of 98.0% or more, more preferably 99.0 to 100%. If the relative density is as low as less than 98.0%, pores will increase. As a result, it may be difficult to control the presence state of the rare earth-Hf—O compound crystals. The $\beta$-$Si_3N_4$ crystal grains preferably have an average aspect ratio of 4 or less. Any $\beta$-$Si_3N_4$ crystal grain preferably has a major axis (longer diameter) of 6 μm or less as an average. The presence state of the grain boundary phase can be controlled by controlling the average aspect ratio and the major axis. As a result, the presence state of the rare earth-Hf—O compound crystals can also be easily controlled.

Examples of the silicon nitride wear resistant member of the embodiment include a bearing ball, a roller, a check ball, a wear pad, a plunger, and a bowl. These wear resistant members slide on a mating member made of a metal member, ceramics, or the like. In order to increase the durability of a sliding surface, these wear resistant members are preferably polished so as to have a surface roughness Ra of 0.1 μm or less. The wear resistant member preferably has a smooth surface having a surface roughness Ra of 0.1 μm or less, more preferably 0.05 μm or less, further preferably 0.01 μm or less.

The durability of the silicon nitride sintered compact is improved and the aggressiveness (attacking property) to the mating member can be reduced by obtaining a smooth sliding surface. Since wear of the mating member can be reduced by reducing the aggressiveness to the mating member, the durability of an apparatus incorporating the wear resistant member can be improved. The polishing is preferably the lapping with a diamond wheel.

For example, F2094 (Standard Specification for Silicon Nitride Bearing Balls) of ASTM (American Society for Testing and Materials) specifies the surface roughness Ra in the range of 0.004 to 0.013 μm as Grade (accuracy of a sphere). In producing such a bearing ball, the accuracy of the sphere having the above surface roughness is required. Note that when the surface roughness Ra is a value smaller than the specified accuracy class (Grade), the surface roughness is at a level that can be used without a problem.

The above lapping is suitable particularly for a member such as a bearing ball in which the whole surface is subjected to polishing. FIG. 1 shows an example of the bearing ball as a wear resistant member, wherein reference numeral 1 represents a bearing ball. The bearing ball is preferably used for a bearing in which a load applied to the bearing ball is 5.1 GPa or less. Examples of such a bearing include a bearing for a machine tool and a fan motor for personal computers.

Further, the bearing ball of the embodiment may have a life of 600 hours or more when a load of 5.1 GPa is applied as a plane pressure and a spindle is rotated at 1200 rpm in a thrust-type rolling fatigue tester. Since the plane pressure is set to 5.1 GPa, excellent wear resistance can be shown in applications in which a load applied to the bearing ball is 5.1 GPa or less.

Next, a method for producing a silicon nitride sintered compact according to the embodiment will be described. The method for producing a silicon nitride sintered compact according to the embodiment comprises the steps of: preparing a raw material mixture powder in which 2 to 4% by mass of a rare earth element in terms of oxide, 2 to 6% by mass of Al in terms of oxide, and 0.1 to 5% by mass of Hf in terms of oxide are added to a silicon nitride powder which is synthesized by a metal nitriding method, has an oxygen content of 1.5% by mass or less, contains $\alpha$-phase silicon nitride in an amount of 80% by mass or more, and has an average particle size of 1 μm or less; molding the resulting raw material mixture powder to obtain a molded product having a relative density of 50 to 58%; and sintering the resulting molded product at a temperature of 1600 to 1950° C. in a non-oxidizing atmosphere, wherein the resulting silicon nitride sintered compact has rare earth-Hf—O compound crystals; in an arbitrary section, an area ratio of the rare earth-Hf—O compound crystals in a grain boundary phase per unit area of 30 μm×30 μm is 5 to 50%; and variation of the area ratios of the rare earth-Hf—O compound crystals between the unit areas is 10% or less.

First, the silicon nitride powder will be described. The silicon nitride powder is preferably synthesized by a metal nitriding method, has an oxygen content of 1.5% by mass or less, contains $\alpha$-phase silicon nitride in an amount of 80% by mass or more, and has an average particle size of 1 μm or less.

A silicon nitride powder synthesized by a metal nitriding method contains 100 to 3000 wt ppm of Fe and 50 to 2000 wt ppm of Ca as metallic impurities. On the other hand, a silicon nitride powder synthesized by an imide decomposition method contains 50 wt ppm or less of Fe and 20 wt ppm or less of Ca as metallic impurities.

The silicon nitride powder shows excellent properties even when using a silicon nitride powder synthesized by a metal nitriding method containing a higher level of metallic impurities. The silicon nitride powder synthesized by a metal nitriding method is prepared by grinding a synthesized silicon nitride bulk. The silicon nitride powder synthesized by a metal nitriding method has a broad particle size distribution since a grinding step is used. When the particle size distribution is broad, a structure in which small particles enter into the gaps between large particles is easily formed. Therefore, a sintered compact having small pores and high density is easily obtained.

Further, the silicon nitride powder synthesized by a metal nitriding method is less expensive than the silicon nitride powder synthesized by an imide decomposition method. Therefore, the cost of the resulting silicon nitride sintered compact can be reduced.

The oxygen content of the silicon nitride powder is preferably 1.5% by mass or less. If the oxygen content is more than 1.5% by mass, the amount of the rare earth-Hf—O compound crystals formed will be affected. Further, the silicon nitride powder preferably contains 80% by mass or more of α-phase silicon nitride and has an average particle size of 1 μm or less. The α-type silicon nitride powder grows to the β-type silicon nitride crystal grain (β-$Si_3N_4$ crystal grain) in the sintering step. A silicon nitride sintered compact excellent in wear resistance can be obtained by being accompanied by the grain growth from α-type to β-type.

As a sintering aid, 2 to 4% by mass of a rare earth element component in terms of oxide, 2 to 6% by mass of an Al component in terms of oxide, and 0.1 to 5% by mass of a Hf component in terms of oxide are added. The rare earth element component is preferably a rare earth oxide powder having an average particle size of 2 μm or less. The Al component is preferably a powder having an average particle size of 2 μm or less which is any one or more of $Al_2O_3$, AlN, and $MgAl_2O_4$ spinel. The Hf component is preferably a $HfO_2$ powder having an average particle size of 2 μm or less.

Optionally, it is preferred to add at least one selected from among 4a group elements (except Hf), 5a group elements, and 6a group elements in an amount of 0.1 to 5% by mass in terms of oxide. The 4a group element (except Hf) component, 5a group element component, and 6a group element component are preferably a powder having an average particle size of 2 μm or less. Optionally, it is preferred to add 2 to 7% by mass of SiC. SiC is preferably a powder having an average particle size of 2 μm or less.

The step of preparing a raw material mixture powder in which a sintering aid powder is added to a silicon nitride powder is a step of uniformly mixing the sintering aid powder with the silicon nitride powder. For uniformly mixing the sintering aid powder with the silicon nitride powder, it is effective to perform the mixing step for a long time.

A cracking mixing step with a ball mill or the like is effective, and the step is preferably performed for a long time of 50 hours or more. The cracking mixing step can prevent formation of secondary particles in which silicon nitride powders are bonded to each other, sintering aid powders are bonded to each other, or a silicon nitride powder and a sintering aid powder are bonded. When most of silicon nitride powders and sintering aid powders form primary particles, uniform mixing can be performed. Also in order to perform uniform mixing, it is preferred to mix powders each having a predetermined particle size.

Next, the step of molding the resulting mixed powder to obtain a molded product having a relative density of 50 to 58% is performed. In producing a molded product, a resin binder is optionally added. The step of obtaining a molded product is preferably performed using a mold (die molding). The molded product preferably has a relative density in the range of 50 to 58%. The density of the molded product is a value obtained by dividing an actual measurement value measured by a dimension weight method by a theoretical density. The theoretical density is a value determined by calculation from the true density and weight of a silicon nitride powder and a sintering aid powder. The relative density is determined by the following equation: relative density (%)=(actual measurement value/theoretical density)×100(%).

In the silicon nitride sintered compact obtained by the production method of the embodiment, the presence state of rare earth-Hf—O compound crystals needs to be controlled. The rare earth-Hf—O compound crystals are formed by the reaction between a rare earth element component and a Hf component during the sintering step. For example, when the rare earth-Hf—O compound crystals are $Y_2Hf_2O_7$ crystals, the reaction may be: $Y_2O_3+2HfO_2 \rightarrow Y_2Hf_2O_7$.

In order to allow such a reaction to smoothly proceed, it is effective to uniformly mix the raw material mixture powders as described above. When the density of the molded product is 50 to 58%, a space for the reaction in the inner part of the molded product can be sufficiently secured. Further, when a gas constituent is produced with the reaction, the gas will be easily released out of the molded product.

If the density of the molded product is less than 50%, the mechanical strength of the resulting sintered compact will be reduced. If the density of the molded product is more than 58%, the reaction for forming the rare earth-Hf—O compound crystals may not be sufficiently performed. A gas produced with the reaction may remain in the inner part without being released to the outside. If the gas remains in the inner part, a variation of dispersion state of the rare earth-Hf—O compound crystals may increase. Therefore, the relative density of the molded product is preferably set to 50 to 58%, more preferably 52 to 56%.

Next, the step of sintering the resulting molded product at a temperature of 1600 to 1950° C. in a non-oxidizing atmosphere is performed. The non-oxidizing atmosphere is preferably an inert atmosphere of nitrogen, argon, or the like. If the sintering temperature is less than 1600° C., the sintering will be insufficient, thus reducing the strength of a sintered compact.

On the other hand, if the sintering temperature is higher than 1950° C., the $Si_3N_4$ crystal grains will excessively grow, and the control of the dispersion state of the rare earth-Hf—O compound crystals will be difficult. The sintering step preferably performed in a pressurized atmosphere. However, when sintering is performed at 1700° C. or less, any of a normal pressure atmosphere and a pressurized atmosphere may be employed. Sintering time is preferably set from 1 to 15 hours. If sintering time is less than 1 hour, sintering may be insufficient. If sintering time is more than 15 hours, the $Si_3N_4$ crystal grains may excessively grow.

Further, before the step of sintering, the molded product is preferably heated at a temperature from 1500 to 1600° C. over 2 hours or more. The temperature range of 1500 to 1600° C. is a temperature in which the rare earth element component reacts with the Hf component. The formation of the rare earth-Hf—O compound crystals can be accelerated by moderately heating the molded product in a temperature region of 1500 to 1600° C. over 2 hours or more.

Note that although the upper limit of the heating time is not particularly limited, the heating time is preferably 15 hours or less in order to prevent the production time from being excessively increased. When the addition amount of the rare earth element component and the Hf component added are in the above range, the reaction to form the rare earth-Hf—O compound crystals will be completed in 15 hours or less. The relative density of the sintered compact can be 98.0% or more by performing such a sintering step.

The resulting sintered compact is preferably subjected to hot isostatic pressing (HIP) treatment at a pressure of 30 MPa or more and a temperature of 1600 to 1950° C. in a non-oxidizing atmosphere. The relative density of the sintered compact can be 99.5 to 100% by performing the HIP treatment.

The silicon nitride sintered compact obtained by applying such a production method can have rare earth-Hf—O compound crystals; in an arbitrary section, an area ratio of the rare earth-Hf—O compound crystals in a grain boundary phase per unit area of 30 μm×30 μm can be 5 to 50%; and variation of the area ratios of the rare earth-Hf—O compound crystals between the unit areas can be 10% or less.

When the silicon nitride sintered compact is applied to a wear resistant member, the surface serving as a sliding surface is subjected to polishing. Further, the polishing is preferably the lapping with a diamond wheel.

EXAMPLES

Example 1

As shown in Table 1, a silicon nitride powder 1 synthesized by a metal nitriding method and a silicon nitride powder 2 synthesized by an imide decomposition method were prepared.

TABLE 1

| Sample No. | Synthesizing Method | Oxygen Content (wt %) | Average Particle Size (μm) | Ratio of α-Type (%) | Impurity Content (wtppm) Fe | Ca |
|---|---|---|---|---|---|---|
| Silicon Nitride Powder 1 | Metal Nitriding Method | 1.2 | 0.7 | 88 | 1200 | 300 |
| Silicon Nitride Powder 2 | Imide Decomposition Method | 0.5 | 0.7 | 98 | 10 | 10 |

Next, combinations shown in Table 2 were prepared as a sintering aid. All the sintering aids prepared had an average particle size of 1.2 μm.

TABLE 2

| Sample No. | Rare Earth Component Addition Amount in terms of Oxide (wt %) | Hf Component Addition Amount in terms of Oxide (wt %) | Al Component Addition Amount in terms of Oxide (wt %) | 4a, 5a, 6a Group Addition Amount in terms of Oxide (wt %) | SiC Addition Amount in terms of Oxide (wt %) |
|---|---|---|---|---|---|
| Sintering Aid 1 | $Y_2O_3$ (2 wt %) | $HfO_2$ (0.5 wt %) | $Al_2O_3$ (2 wt %) AlN (2 wt %) | — | — |
| Sintering Aid 2 | $Y_2O_3$ (4 wt %) | $HfO_2$ (1 wt %) | $Al_2O_3$ (5 wt %) | — | — |
| Sintering Aid 3 | $Y_2O_3$ (4 wt %) | $HfO_2$ (1.5 wt %) | $Al_2O_3$ (2 wt %) AlN (3 wt %) | $Mo_2C$ (1 wt %) | — |
| Sintering Aid 4 | $Y_2O_3$ (3.5 wt %) | $HfO_2$ (2 wt %) | $Al_2O_3$ (2 wt %) AlN (2 wt %) | $Mo_2C$ (1 wt %) | SiC (3 wt %) |
| Sintering Aid 5 | $Y_2O_3$ (4 wt %) | $HfO_2$ (3 wt %) | $Al_2O_3$ (3 wt %) AlN (2 wt %) | $Mo_2C$ (1 wt %) | SiC (4 wt %) |
| Sintering Aid 6 | $Y_2O_3$ (4 wt %) | — | $Al_2O_3$ (3 wt %) AlN (2 wt %) | $TiO_2$ (1 wt %) | SiC (2 wt %) |
| Sintering Aid 7 | $Y_2O_3$ (3 wt %) | $HfO_2$ (3 wt %) | $Al_2O_3$ (2 wt %) AlN (2 wt %) | $Mo_2C$ (0.5 wt %) | SiC (3 wt %) |
| Sintering Aid 8 | $Y_2O_3$ (4 wt %) | $HfO_2$ (5 wt %) | $Al_2O_3$ (3 wt %) AlN (2 wt %) | $Mo_2C$ (3 wt %) | SiC (3 wt %) |
| Sintering Aid 9 | $Er_2O_3$ (3 wt %) | $HfO_2$ (0.7 wt %) | $Al_2O_3$ (3 wt %) AlN (3 wt %) | $Mo_2C$ (2 wt %) | — |
| Sintering Aid 10 | $Er_2O_3$ (3 wt %) | $HfO_2$ (0.7 wt %) | $Al_2O_3$ (3 wt %) AlN (3 wt %) | $Mo_2C$ (3 wt %) | SiC (7 wt %) |

Next, the silicon nitride sintered compacts of Examples 1 to 9 and Comparative Examples 1 to 2 were produced by combining the silicon nitride powders 1 to 2 with the sintering aids 1 to 10 and treating (processing) the combinations under the treatment conditions shown in Table 3. Note that the molding step was performed using a mold.

TABLE 3

| Sample No. | Silicon Nitride Powder | Sintering Aid Powder | Mixing Time for Material Powder Mixture (hr) | Density of Molded Product (%) | Heating Time to 1500~1600° C. (hr) | Sintering Step (Temp. × Time) | HIP Treatment (Temp. × Time × Pressure) |
|---|---|---|---|---|---|---|---|
| Example 1 | Silicon Nitride Powder 1 | Sintering Aid 1 | 50 | 52 | 3 | 1700° C. × 5 hr | 1700° C. × 2 hr × 90 MPa |
| Example 2 | Silicon Nitride Powder 1 | Sintering Aid 2 | 55 | 53 | 5 | 1750° C. × 4 hr | 1650° C. × 2 hr × 97 MPa |
| Example 3 | Silicon Nitride Powder 1 | Sintering Aid 3 | 60 | 55 | 5 | 1650° C. × 4 hr | 1650° C. × 1 hr × 100 MPa |
| Example 4 | Silicon Nitride Powder 1 | Sintering Aid 4 | 70 | 56 | 6 | 1800° C. × 4 hr | 1700° C. × 2 hr × 110 MPa |

TABLE 3-continued

| Sample No. | Silicon Nitride Powder | Sintering Aid Powder | Mixing Time for Material Powder Mixture (hr) | Density of Molded Product (%) | Heating Time to 1500~1600° C. (hr) | Sintering Step (Temp. × Time) | HIP Treatment (Temp. × Time × Pressure) |
|---|---|---|---|---|---|---|---|
| Example 5 | Silicon Nitride Powder 1 | Sintering Aid 5 | 70 | 56 | 7 | 1775° C. × 5 hr | 1700° C. × 1 hr × 105 MPa |
| Comparative Example 1 | Silicon Nitride Powder 1 | Sintering Aid 1 | 50 | 60 | 3 | 1700° C. × 5 hr | 1700° C. × 2 hr × 90 MPa |
| Comparative Example 2 | Silicon Nitride Powder 2 | Sintering Aid 6 | 50 | 48 | 0.5 | 1775° C. × 5 hr | 1700° C. × 2 hr × 90 MPa |
| Example 6 | Silicon Nitride Powder 1 | Sintering Aid 7 | 70 | 50 | 10 | 1800° C. × 7 hr | 1720° C. × 1 hr × 115 MPa |
| Example 7 | Silicon Nitride Powder 1 | Sintering Aid 8 | 70 | 58 | 15 | 1800° C. × 7 hr | 1700° C. × 1 hr × 110 MPa |
| Example 8 | Silicon Nitride Powder 1 | Sintering Aid 9 | 70 | 53 | 6 | 1800° C. × 7 hr | 1750° C. × 1 hr × 90 MPa |
| Example 9 | Silicon Nitride Powder 1 | Sintering Aid 10 | 90 | 56 | 9 | 1850° C. × 7 hr | 1750° C. × 1 hr × 110 MPa |

Each of the resulting sintered compacts was measured for relative density (%), XRD analysis, and dispersion state of rare earth-Hf—O compound crystals. In the XRD analysis, intensity I1 of a peak at 30.0±0.5°, intensity I2 of a peak at 27.1±0.5°, and intensity I3 of a peak at 33.7±0.5° were measured, and a value of I1/[(I2+I3)/2] was shown.

Note that the XRD analysis was performed using a Cu target (Cu-Kα), at a tube voltage of 40 kV, at a tube current of 40 mA, at a scanning speed of 2.0°/min, using a slit (RS) of 0.15 mm, and in a scanning field (2θ) of 10° to 60°.

For measuring the dispersion state of rare earth-Hf—O compound crystals, SEM photographs (at a magnification of 3000 times) for five different places each having a unit area of 30 μm×30 μm were taken in an arbitrary section of each sintered compact. The area ratio (%) was obtained by dividing the total area of the rare earth-Hf—O compound crystals which look white in the SEM photographs by the total area of the grain boundary phase followed by averaging, and the largest deviation from the average value was shown as the variation. The results of the measurement are shown in Table 4 below.

TABLE 4

| | | | Rare Earth-Hf-O Compound Crystal | |
|---|---|---|---|---|
| Sample No. | Relative Density (%) | XRD (I1/[(I2 + I3)/2]) | Area Ratio (%) | Variation in Area Ratios (%) |
| Example 1 | 99.9 | 0.1 | 10 | 10 |
| Example 2 | 99.9 | 0.2 | 15 | 8 |
| Example 3 | 99.9 | 0.2 | 20 | 6 |
| Example 4 | 99.9 | 0.2 | 30 | 6 |
| Example 5 | 99.9 | 0.2 | 40 | 6 |
| Comparative Example 1 | 99.9 | 0.05 | 10 | 35 |
| Comparative Example 2 | 99.9 | 0 (No Peak of I1) | — | — |
| Example 6 | 99.9 | 0.15 | 30 | 7 |
| Example 7 | 99.9 | 0.2 | 40 | 6 |
| Example 8 | 99.8 | 0.1 | 20 | 6 |
| Example 9 | 99.8 | 0.1 | 20 | 7 |

In the silicon nitride sintered compact according to each Example, the dispersion state of the rare earth-Hf—O compound crystals satisfied the present embodiment.

Next, the silicon nitride sintered compacts according to each Example and Comparative Example were subjected to lapping treatment using a diamond wheel. In the lapping treatment, diamond abrasive grains having a particle size of 0.25 μm was used to measure (1) polishing time to reduce the surface roughness Ra from 1 μm to 0.1 μm, (2) polishing time to reduce the surface roughness Ra from 0.10 μm to 0.01 μm, and (3) polishing time to reduce the surface roughness Ra from 0.01 μm to 0.004 μm. The polishing time was shown as a ratio to that of Comparative Example 2 which was set to 100. The results are shown in Table 5 below.

TABLE 5

| | Polishing Treatment | |
|---|---|---|
| Sample No. | (2) Surface Roughness Ra 0.01 μm | (3) Surface Roughness Ra 0.004 μm |
| Example 1 | 62 | 67 |
| Example 2 | 72 | 75 |
| Example 3 | 60 | 70 |
| Example 4 | 66 | 69 |
| Example 5 | 66 | 70 |
| Comparative Example 1 | 65 | 72 |
| Comparative Example 2 | 100 | 100 |
| Example 6 | 67 | 73 |
| Example 7 | 77 | 85 |
| Example 8 | 69 | 75 |
| Example 9 | 64 | 70 |

As is apparent from the results shown in Table 5 above, the silicon nitride sintered compact according to each Example had short polishing time.

Next, a bearing ball polished to a surface roughness Ra of 0.01 μm was produced and subjected to the abrasion resistant test. In the abrasion resistant test, the time until the surface of the silicon nitride ball (bearing ball) was peeled was measured when a load of 5.1 GPa as a plane pressure was applied and a spindle was rotated at 1200 rpm in a thrust-type rolling fatigue tester. Note that the upper limit of the measuring time was 600 hours. Note that the test results in which the surface peeling was not identified even after the lapse of 600 hours were shown as "600 hours or more". The results are shown in Table 6 below.

TABLE 6

| Sample No. | Abration Resistance Test |
|---|---|
| Example 1 | 600 hr or more |
| Example 2 | 600 hr or more |
| Example 3 | 600 hr or more |
| Example 4 | 600 hr or more |
| Example 5 | 600 hr or more |
| Comparative Example 1 | 400 hr |
| Comparative Example 2 | 600 hr or more |
| Example 6 | 600 hr or more |
| Example 7 | 600 hr or more |
| Example 8 | 600 hr or more |
| Example 9 | 600 hr or more |

As is apparent from Table 6 above, the wear resistant member (bearing ball) according to each Example showed excellent wear resistance. As a result, it was verified that the wear resistant members according to Examples had both satisfactory processability and satisfactory wear resistance.

Although several embodiments of the present invention have been illustrated, these embodiments are presented as examples only and are not intended to limit the scope of the present invention. These novel embodiments can be performed in other various modes, and various omissions, substitutions and changes can be made without departing from the spirit of the invention. These embodiments and modifications thereof are included in the scope and spirit of the present invention, and included in the invention described in the claims and its equivalent scope. Each embodiment described above can be performed in combination with each other.

REFERENCE SIGNS LIST

1 . . . Bearing ball
2 . . . $Si_3N_4$ crystal grain
3 . . . Rare earth-Hf—O compound crystal
4 . . . Grain boundary glass phase

The invention claimed is:

1. A silicon nitride wear resistant member comprising a silicon nitride sintered compact containing $\beta$-$Si_3N_4$ crystal grains as a main component, 2 to 4% by mass of a rare earth element in terms of oxide, 2 to 6% by mass of Al in terms of oxide, and 0.1 to 5% by mass of Hf in terms of oxide,
  wherein, the silicon nitride sintered compact has rare earth-Hf—O compound crystals,
  wherein, in an arbitrary section, an area ratio of the rare earth-Hf—O compound crystals in a grain boundary phase per unit area of 30 μm×30 μm is 5 to 50%,
  wherein a variation of five area ratios, which do not overlap each other, of the rare earth-Hf—O compound crystals between the unit areas is 10% or less, and
  wherein, when the silicon nitride sintered compact is subjected to XRD analysis, an intensity I1 of a peak at 30.0±0.5° based on the rare earth-Hf—O compound crystals, an intensity I2 of a peak at 27.1±0.5° and an intensity I3 of a peak at 33.7±0.5° based on the $\beta$=$Si_3N_4$ crystals satisfy I1/[(I2+I3)/2]=0.1 to 0.2.

2. The silicon nitride wear resistant member according to claim 1, wherein an average particle size of the rare earth-Hf—O compound crystals is 1 μm or less.

3. The silicon nitride wear resistant member according to claim 1, wherein the silicon nitride sintered compact contains at least one selected from 4a group elements (except Hf), 5a group elements, and 6a group elements in an amount of 0.1 to 5% by mass in terms of oxide.

4. The silicon nitride wear resistant member according to claim 1, wherein the silicon nitride sintered compact contains 2 to 7% by mass of SiC.

5. The silicon nitride wear resistant member according to claim 1, wherein the wear resistant member is a bearing ball.

6. The silicon nitride wear resistant member according to claim 1, wherein a life is 600 hours or more when a load of 5.1 GPa as a plane pressure is applied and a spindle is rotated at 1200 rpm in a thrust rolling fatigue tester.

7. A method for producing a silicon nitride sintered compact comprising the steps of:
  preparing a raw material mixture powder in which 2 to 4% by mass of a rare earth element in terms of oxide, 2 to 6% by mass of Al in terms of oxide, and 0.1 to 5% by mass of Hf in terms of oxide are added to a silicon nitride powder which is synthesized by a metal nitriding method, has an oxygen content of 1.5% by mass or less, contains α-phase silicon nitride in an amount of 80% by mass or more, and has an average particle size of 1 μm or less;
  molding the resulting raw material mixture powder to obtain a molded product having a relative density of 50 to 58%; and
  sintering the resulting molded product at a temperature of 1600 to 1950° C. in a non-oxidizing atmosphere,
  wherein the resulting silicon nitride sintered compact has rare earth-Hf—O compound crystals,
  wherein, in an arbitrary section, an area ratio of the rare earth-Hf—O compound crystals in a grain boundary phase per unit area of 30 μm×30 μm is 5 to 50%,
  wherein a variation of five area ratios, which do not overlap each other, of the rare earth-Hf—O compound crystals between the unit areas is 10% or less, and
  wherein, when the silicon nitride sintered compact is subjected to XRD analysis, an intensity I1 of a peak at 30.0±0.5° based on the rare earth-Hf—O compound crystals, an intensity I2 of a peak at 27.1±0.5° and an intensity I3 of a peak at 33.7±0.5° based on the $\beta$=$Si_3N_4$ crystals satisfy I1/[(I2+I3)/2]=0.1 to 0.2.

8. The method for producing a silicon nitride sintered compact according to claim 7, wherein before the step of sintering, the molded product is heated at a temperature from 1500° C. to 1600° C. over 2 hours or more.

9. The method for producing a silicon nitride sintered compact according to claim 7, wherein the resulting sintered compact is subjected to hot isostatic pressing (HIP) treatment at a pressure of 30 MPa or more and a temperature of 1600 to 1950° C. in a non-oxidizing atmosphere.

10. The method for producing a silicon nitride sintered compact according to claim 7, wherein the step of preparing a raw material mixture powder comprises a step of adding at least one element selected from elements in the group consisting of group 4a elements except Hf, group 5a elements, and group 6a elements, in an amount of 0.1 to 5% by mass in terms of oxide.

11. The method for producing a silicon nitride sintered compact according to claim 7, wherein the step of preparing a raw material mixture powder comprises a step of adding 2 to 7% by mass of SiC.

* * * * *